United States Patent [19]
Rehfeld

[11] Patent Number: 5,454,395
[45] Date of Patent: Oct. 3, 1995

[54] FLUID MOTOR METERING DEVICE

[76] Inventor: Frederick L. J. Rehfeld, 2901 Tildon Dr., Saginaw, Mich. 48603

[21] Appl. No.: 294,485

[22] Filed: Aug. 23, 1994

[51] Int. Cl.⁶ ............................................. G05D 11/03
[52] U.S. Cl. .......................... 137/99; 417/377; 417/403
[58] Field of Search ........................... 137/99; 417/377, 417/403

[56] References Cited

U.S. PATENT DOCUMENTS

4,832,071  5/1989  Rehfeld ................................. 137/99

Primary Examiner—Robert G. Nilson
Attorney, Agent, or Firm—Robert J. Rhead

[57] ABSTRACT

This invention relates to an accurate mechanical proportioning pump and/or mixing device that is adaptable for industrial, commercial and consumer use that incorporates a series of piston-seal-cylinder configuration with necessary check valves and seats that automatically proportionally pumps and/or mixes such fluids as soaps, fruit concentrates, food syrups, pesticides, herbicides, fungicides and fertilizers based on various other fluid driving mediums with a high degree of accuracy of controlled fluid to driving mediums.

21 Claims, 4 Drawing Sheets

FLUID MOTOR METERING DEVICE

BACKGROUND OF THE INVENTION

This invention relates to a fluid motor metering device with significant improvements in accuracy and flow range spread and also a reduction in physical size. Particularly, it relates to an inexpensive, self-powered, portable, self-priming, positive displacement pump. This pump has a multiplicity of uses in the lawn and garden industry, food processing, farming and in general use wherever a metering pumping device is required.

More particularly, this pumping device has specific application to the "do-it-yourself" user as an attachment to garden hose-sprayers for the application of fertilizers, herbicides and pesticides. The use of the garden hose-sprayers with this pumping device is unexpectedly effective and accurate regardless of the water flow pressure through the hose or lack of same.

It has been known in the prior art to use Venturi devices to accomplish similar ends but they are limited by back pressure exhibited at the orifice of the Venturi. Back pressure in the Venturi system is caused, among other things, by the length of hose, its size, and the type of nozzle or sprinkler.

Professional, industrial and commercial users have available a number of positive displacement devices. However most use a valve actuation mechanism like that of a traditional light switch. That is an over-center mechanism which actuates whenever the trigger is over center. These mechanisms are located about the devices centerline but never on it due to their physical construction needs. They are mechanically linked and must travel a specified distance to be actuated.

I have unexpectedly found that by using the input flow of water into this device that it will pump another substance or substances at the rate proportional to the input fluid flow.

PRIOR ART

This present invention is an unexpected improvement in my U.S. Pat. No. 4,832,071. The following patent references are believed to be of general interest in view of my invention.

U.S. Pat. No. 4,557,071 to Fah (1985) disclosing a watering and feeding system for plants, comprising a container enclosing a platformed water reservoir, housing a water supply unit, a fertilizer dispensing unit, a nutrient conveying wick and a water level indicator unit, all of which are interacting to provide automatic and adequately measured amount of nutrients to the plants.

U.S. Pat. No. 4,340,179 to Knapp (1982) a lawn and garden feeding apparatus including a container made of transparent plastic, having inlet and outlet hose connections and a disposable cartridge which is inserted into the container. The cartridge comprises a gel with plant nutrient and a water soluble dye suspended therein with the cartridge fitting the inside of the container and having a bore communicating with the inlet and outlet connections. The container inlet is connected by a garden hose to a source of water and the outlet is connected by a hose to a conventional sprinkler or nozzle so that in use of apparatus, water flows through the cartridge bore drawing nutriment and dye from the gel in micro-feeding amounts, and is discharged through the sprinkler or nozzle. Extraction of dye from the gel, after a selected period of time, results in a perceptible change in gel color, indicating that the cartridge requires replacement.

U.S. Pat. No. 4,315,600 (1982) to Rhoades which deals with a trigger actuated fertilizer spray gun which has a herbicide injector mounted on its muzzle with the valve for the injector having an actuator which is also accessible from handle of the gun, so that an operator, while spraying fertilizer, can make spot applications of a herbicide as weeds are encountered in the area being fertilized. The herbicide is carried in a canister which can either be mounted on the handle of the spray gun or on a belt worn by the operator and the canister is divided into first and second, variable volume chambers by a flexible diaphragm. The first chamber is connected to the flow passage of the fertilizer to pressurize it to approximately the line pressure of the fertilizer flow, and the second chamber, containing the herbicide, is connected to the injector at a Venturi-shaped portion of a passage through it. The second, herbicide filled chamber is therefore under pressure exerted by the diaphragm so that when the valve is opened the herbicide is sprayed into the flow of fertilizer passing through the injector. The Venturi-shaped portion of the passage at the point where the herbicide is injected into the fertilizer flow also facilitates herbicide flow so that there is an almost instantaneous flow of herbicide into the fertilizer when the valve is actuated.

U.S. Pat. No. 2,060,735 (1936) to Krueger which deals with a method and a means for applying nutrient solutions to plants by forced aeration of the plant bed by feeding a nutrient solution from the under part of the plant bed and then automatically draining off the solution and the means of accomplishing the same.

U.S. Pat. Nos. 3,937,241; 4,684,332 and 5,137,435 are positive displacement pumps as is the applicant technology. All are applicable to industrial and/or commercial user needs.

The aforementioned three devices are representative of the current technology over-center mechanically linked valve actuating mechanism which cycles the respective devices.

U.S. Pat. No. 3,818,924 (1977) issued to Carlyle is a position sensitive valve actuation device. However, it is not positive displacement. The return stroke is either gravity, spring or combination thereof returned.

SUMMARY OF THE INVENTION

The fluid motor metering device of this invention is activated by a controlled input fluid flow. This device pumps another substance or substances, i.e. metered fluid, at a rate proportional to the controlled input fluid flow. This device has an accessible cylindrical housing unit, having a controlled input fluid inlet openings connected to an inlet chamber, having a discharge opening connected to a discharge chamber.

A metered fluid chamber or chambers connected to an inlet opening for the fluid or fluids to be metered or pumped. A means is provided of moving or pumping the fluids to a discharge chamber or chambers.

The discharge chamber or chambers of the fluids being metered or pumped may be or may not be common with each other and or the controlled fluid discharge chamber as desired.

The various chambers in the accessible cylindrical housing though separated from each other have access to each other via inter-connecting passageways. These passageways are opened or closed by valves by a means so that pressure is applied to the pistons and the pistons are so moved by this pressure so as to assure the desired ratio of metered fluids are pumped relative to the control input fluid flow. The mixing chamber and discharge chamber are the same cylinder cavity but separated and defined by specific valves and a piston that bridge the cylinder cavity.

The controlled fluid is introduced into the control fluid inlet chamber. The flow rate of this controlled fluid may be varied by either limiting the flow rate into the inlet chamber or by limiting how fast it can flow out the discharge outlet.

This invention has a special utility for dispersing controlled fluids in a wide area of applications; for example, in the dispensing of liquid soaps into wash media; in the dispensing of concentrated soda pop syrups into carbonated waters; in the mixing of oils into gasoline in two-cycle engines; and any other mechanical mixing of fluids. These are examples and this invention is not limited by these examples.

DESCRIPTION OF THE INVENTION

In the drawings like reference characteristics designate similar parts in the several views of the drawings.

Figure 1:
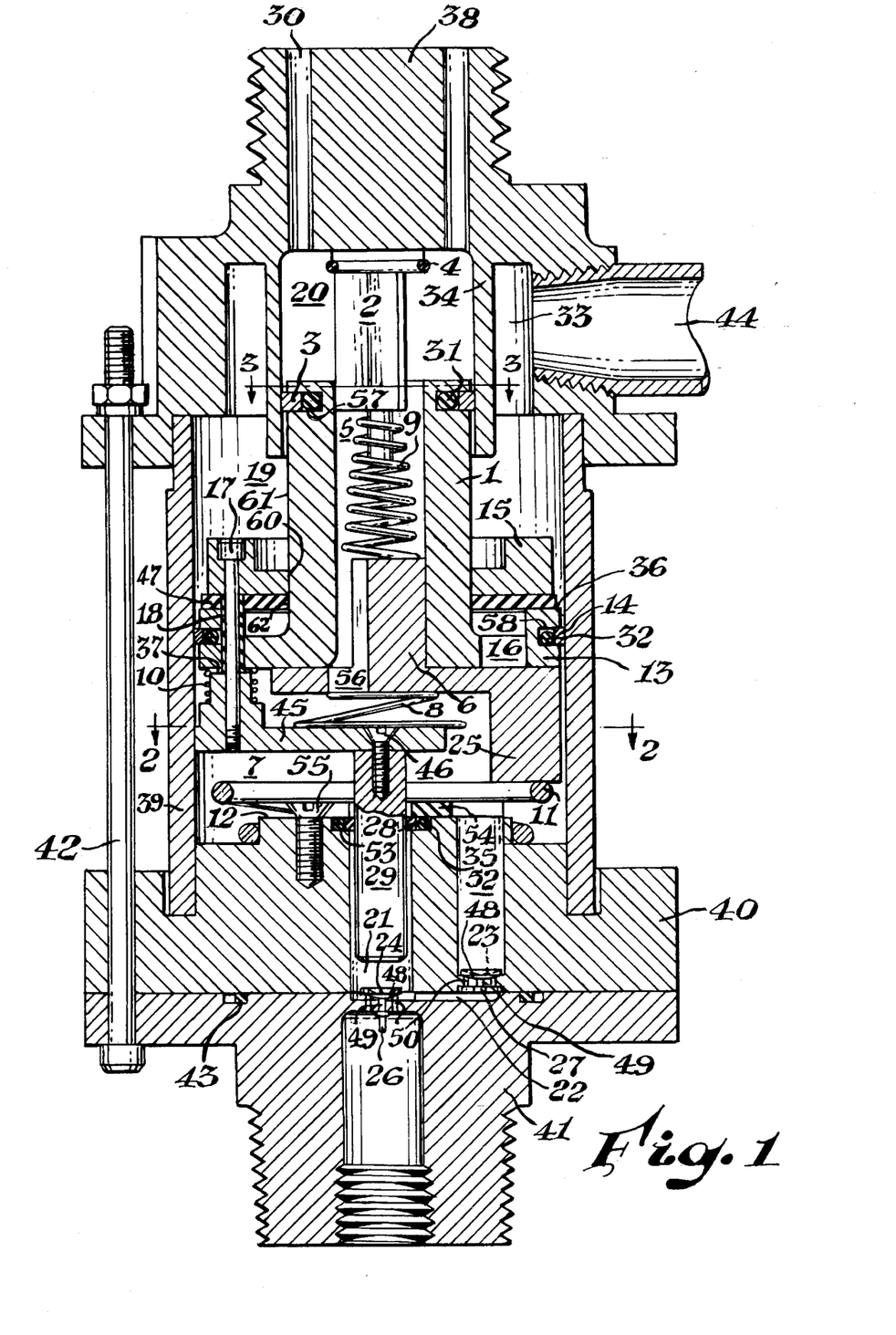
FIG. 1 is a longitudinal cross section taken on its mid-line of the entire device according to the invention.
Figure 2:
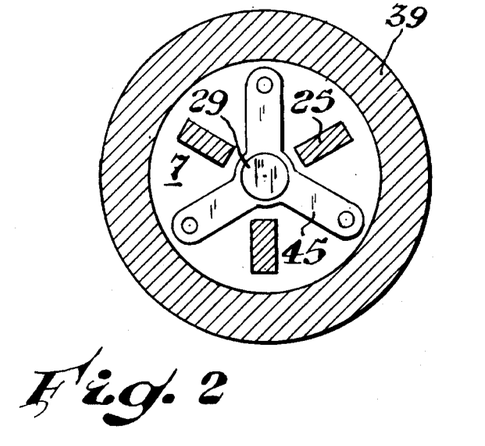
FIG. 2 is a transverse sectional view taken along line 2—2 FIG. 1.
Figure 3:
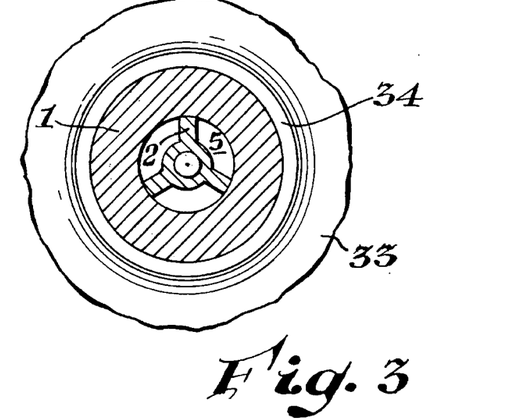
FIG. 3 is a transverse sectional view taken along line 3—3 FIG. 1.

In FIG. 1 the inlet chamber 20 contains spring loaded lift valve 2 and "o" ring seal 4 which is affixed to lift valve 2 and moves with same and the first piston of lesser working area 1 and continuous seal 3 with its biasing "o" ring 31 which seals any leakage path behind seal 3.

Spring loaded lift valve 2 and "o" ring seal 4 which is affixed to lift valve 2 and moves with same can close symmetrical passage 5 to the mixing chamber 7. Spring loaded lift valve 2 and spring loaded reversing valve 6 both fit in symmetrical passage 5 and their length is such as to prevent both spring loaded lift valve 2 and spring loaded reversing valve 6 from being closed at the same time. There is also a weak spring 9, between the spring loaded lift valve 2 and spring loaded reversing valve 6 that tend to keep them apart. FIG. 1 shows spring loaded reversing valve 6 closed.

There is also a weak spring 8, strong enough to overcome gravity in any direction of operation and hold spring loaded reversing valve 6 closed unless some other force is holding spring loaded reversing valve 6 open.

As shown in FIG. 1 spring loaded lift valve 2 is open and spring loaded reversing valve 6 is closed. Therefore, when controlled fluid flows into controlled fluid inlet chamber 20, it flows past spring loaded lift valve 2, past seal 4, thru symmetrical passage 5 into mixing chamber 7. Valve 23, spring loaded reversing valve 6, continuous seals 14 and 28 in conjunction with their respective biasing "o" rings 32 and 35 which seal any leakage path behind the continuous seals 14 and 28 block the controlled fluid flow from metered fluid chamber 21 and discharge chamber 19. Because second piston of greater working area 13 is larger than the first piston 1, the controlled fluid flow moves the first piston and the second piston toward the controlled fluid inlet plurality of openings 30 of accessible cylindrical housing 34.

The movement of the second piston 13 toward the discharge chamber 19 forces fluid out the discharge opening 33 to output port 44. As this movement continues the spring loaded lift valve 2 approaches the end of controlled fluid inlet chamber 20. This movement then compresses the spring 9. Further movement causes spring loaded lift valve 2 to touch spring loaded reversing valve 6. This touching and/or the force of spring 9 opens spring loaded reversing valve 6. This opens one or more orifices 16 but does not, repeat, does not stop the movement of the second piston. Controlled fluid flow will continue to move the first piston and the second piston in the same direction they were going.

Injection metering piston 29 shown here as a single piston but in fact could be several pistons if it is desired to pump more than one substance or substances at more than one rate, or to more than one place.

Force is required to over come seal friction of this piston or pistons similar to injection metering piston 29. Also, force is required to pump against the pressure in mixing chamber 7. These combined forces are transmitted to spring loaded flow control valve 15 by connectors 17. Spring loaded flow control valve 15 has an area such that the variable force transmitted to it by connectors 17 and the force of plurality of springs 10 are sufficient to cause adequate pressure drop of any controlled fluid that passes through one or more plurality of orifices 16 from mixing chamber 7 to discharge chamber 19 so as to effectively block the flow. This causes the first piston and the second piston to continue moving until the spring loaded lift valve 2 and "o" ring seal 4 which is affixed to lift valve 2 and moves with the same closes on piston 1.

Flow control valve 15 has a pliable member 47 between it and the larger piston 13 to make face seal 36 between member 13 and 15.

The area of spring loaded flow control valve 15 and the spring force load of springs 10 and the load of connectors 17 acting on spring loaded flow control valve 15 must be such that when spring loaded lift valve 2 closes the rise of pressure in the controlled fluid inlet chamber 20 is able to do two things. First, keep spring loaded lift valve 2 and seal 4 closed against piston 1 by raising the pressure in controlled fluid inlet chamber 20 above the pressure in mixing chamber 7 and secondly, this rise in pressure in controlled fluid inlet chamber 20 acting on the first piston must be able to raise the pressure in mixing chamber 7 higher than discharge chamber 19 so that spring loaded flow control valve 15 and its pliable member 47 are raised off its face seal 36 and the first piston of lesser working area 1 and the second piston 13 are reversed and fluid in mixing chamber 7 is forced to discharge chamber 19 and out the discharge opening 33 to discharge port 44.

Note, force on injection metering piston 29 and or any other pistons doing similar work are transferred to spring loaded flow control valve 15 and depending on the pressure in mixing chamber 7 and seal friction of continuous seal 28 plus the pressure in metered fluid chamber 21 and or similar chambers will vary the load on the connectors 17. This force on connectors 17 plus the force of springs 10 can cause the pressure drop from mixing chamber 7 to discharge chamber 19, which is required to raise spring loaded flow control valve 15 and its pliable member 47 opening face seal 36 to be self adjusting as required for various operating conditions. It is important that spring loaded flow control valve 15 and its pliable member 47 and its face seal 36 restrict the flow through the one or more orifices 16 adequately so that the first piston has enough pressure on it so spring loaded lift valve 2 and "o" ring seal 4 affixed there upon stay seated against piston 1 until the other end of the stroke.

Metered fluid chamber 21 is filled with metered fluid that comes in through input check valve 24 which is closed by elastomeric valve 24's integral elastomeric stem and ball lock 26 which is in tension when injection metering piston 29 has caused the volume of metered fluid chamber 21 to be maximum.

When the first piston 1 and the second piston 13 reverse then as soon as the lost motion 37 (enlarged view shown in FIG. 6) between the assembly of injection metering piston 29, connectors 17, spacers 18 and spring loaded flow control valve 15 relative to the second piston 13 is taken up injection metering piston 29 reverses. The reversal then causes the substance in metered fluid chamber 21 to be discharged through passage 22 to output check valve 23 which is raised against elastomeric valve 23's integral elastomeric stem and ball lock 27 which is in tension. The metered fluid mixes with the controlled fluid in mixing chamber 7 and passes through the now open spring loaded reversing valve 6 and one or more orifices 16 and via face seal 36 of spring loaded flow control valve 15 and its pliable member 47 and the second piston 13 into discharge chamber 19.

It is also realized what is shown as a single injection metering piston 29 could be several pistons pumping the same or other substances at various ratios to various places as desired.

The piston assemblies of the first piston 1, second piston 13, and injection metering piston 29 continues movement toward metered fluid chamber 21 until first the legs of the spring loaded reversing valve 6, one leg shown by 25, strikes stop 12 and receives the force of spring 11.

As movement of the piston assemblies continue, the force of spring 11 and or the bottoming at stop 12 forces the spring loaded reversing valve 6 against spring loaded lift valve 2. Stop 12 and spring loaded reversing valve 6 stop spring loaded lift valve 2 from moving toward metered fluid chamber 21. Controlled fluid flow keeps pushing against the first piston 1 until spring loaded lift valve 2 and "o" ring seal 4 affixed there upon is unseated from piston 1. This allows the pressure in controlled inlet chamber 20 to approach the pressure of mixing chamber 7. This lowers the force trying to hold spring loaded lift valve 2 and "o" ring seal 4 affixed there upon on piston 1 and spring 11 quickly closes spring loaded reversing valve 6 which opens spring loaded lift valve 2 still further. Spring 9 now moves spring loaded lift valve 2 far off its seat so as to prevent pressure surges in the controlled fluid input lines from prematurely closing spring loaded lift valve 2.

As soon as spring loaded reversing valve 6 closes controlled fluid flow reverses the direction of the first piston 1 and the second piston 13. At the time of reversal friction of continuous seal 28 of injection metering piston 29 and or other similar pistons pumping a metered fluid could have been enough so connectors 17 could have been holding spring loaded flow control valve 15 and its pliable member 47 open and allow flow through one or more orifices 16 if it were not for spring loaded reversing valve 6, restricting this flow. After spring loaded reversing valve 6 closes the plurality of orifices 16 and the first piston 1 and the second piston 13 are reversed and have taken up the lost motion 37 between the assembly of injection metering piston 29, connectors 17, spacers 18, spring loaded flow control valve 15 and its pliable member 47 and the second piston 13, then spring loaded flow control valve 15 and its pliable member 47 and the second piston 13, then spring loaded flow control 15 and its pliable member 47 is closed and spring loaded reversing valve 6 is no longer required. This is why spring loaded reversing valve 6 may be opened before spring loaded lift valve 2 and "o" ring seal 4 affixed there upon is seated against piston 1 and not stop the movement of the first piston 1, the second piston 13 and injection metering piston 29 until this movement eventually seats spring loaded lift valve 2 and "o" ring seal 4 affixed there upon against piston 1 and reverses the piston assemblies again.

It should be noted in FIG. 1 that inlet chamber 20, mixing chamber 7, discharge chamber 19 and metered fluid chamber 21 are dynamically defined spaces between respective combinations of adjacent valves and pistons that are all in constant reciprocating motion when the device is operating.

It is also realized that if flow rate and back pressure of the controlled fluid were controlled to reasonably constant value it would be possible to simplify some of the mechanism shown but what we show can operate over a very broad range of flows and back pressures on the control led fluid.

The theoretical ratio "R" of controlled fluid passed through the system to one (1) unit of metered fluid passed through the system is the diameter "D" squared (diameter of the second piston of greater working area) minus the diameter "d" squared (diameter of the injection metering piston) divided by the diameter "d" squared (diameter of the injection metering piston)

$$R=(D^2-d^2)\div d^2$$

The continuous sealing rings 3, 14 and 28 are preferably made of teflon(R) or glass filled teflon(R).

A desired trait of any pumping proportioning device is that it have the desired controlled fluid volume capability with equal desirable traits of compactness and accuracy of controlled fluid to metered fluid.

Present U.S. Pat. No. 4,832,071 has a driving motor whose large piston of the motor has a diameter of 2.5 inches. This device is capable of 5 G.P.M. total output and a minimum flow of 0.5 G.P.M. The accuracy of controlled fluid to metered fluid is +/− 10% maximum error over the total flow and back pressure range.

With the implementation of the enhancements contained herein and their associated requirements it was found that the maximum flow capacity of 5 G.P.M. was maintained, however, the motor piston 13 of larger working area in FIG. 1 was reduced from 2.5 inches diameter to 1.875 inches diameter. Likewise all other details were scaled down proportionately.

Unexpectedly the lower limit of flow which previously was 0.5 G.P.M. was lowered to 0.005 G.P.M.

Also, equally unexpected was the accuracy of the device improved from +/− 10% maximum error previously to +/− 2% maximum error over the entire flow range of 0.005 G.P.M. to 5 G.P.M. and back pressure range. The ensuing enhancements are made relative to the device in U.S. Pat. No. 4,832,071.

Figure 14:
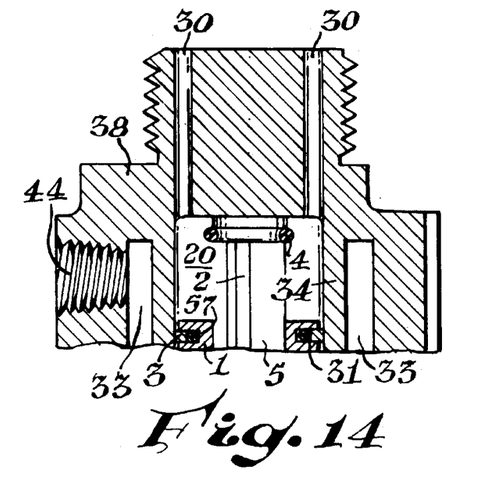
FIG. 14 is an enlarged fragmentary cross sectional view of the spring loaded lift valve with its attached "o" ring seal.

Refer to FIG. 1 and FIG. 14 controlled fluid end cap 38. By utilizing a number of inlet opening 30 shown as cylindrical holes, but said openings can be whatever cross sectional shape desired, so long as they are positioned such that the cross sectional plane of same doesn't intersect with the cross sectional plane of the assembly of seal 4 on lift valve 2 of FIG. 1 and FIG. 14. Said openings 30 versus one central inlet hole (not shown) whose cross sectional plane would intersect with the cross sectional plane of the assembly of seal 4 on lift valve 2, it was determined, that lift valve 2's biasing spring 9 FIG. 1 compression strength requirement was vastly reduced than that required for the latter single hole.

Effectively what is occurring is that by utilization of multiple inlet openings 30 off center as described directs the controlled fluid entering inlet openings 30 under pressure and velocity (ie. velocity is kinetic energy) away from directly impacting the assembly of lift valve 2 and seal 4 affixed thereon of FIG. 1 and FIG. 14. This direct impact avoidance reduces the amount of kinetic energy transferred to the assembly of lift valve 2 and seal 4.

Any kinetic energy transferred to lift valve 2 must be counter balanced by the strength of lift valve 2's biasing spring 9 to keep said valve 2 open during a portion of its cyclic travel.

Hence, by reducing the amount of driving fluid kinetic energy impact against lift valve 2 and seal 4 reduces the size of spring 9 required to function the device.

Kinetic energy of the controlled fluid used to compress lift valve 2's biasing spring 9 is lost energy. It is one of the major contributors of the energy required to make the device function. This loss s measured a s pressure drop across the device.

If the pressure drop across any fluid device can be reduced you have a more efficient device. Utilizing inlet openings 30 in FIG. 1 and FIG. 14 as just described yields a more efficient device.

Additionally, it was also determined that the efficiency of the device could be significantly impacted by affixing seal 4 to lift valve 2 as shown in FIG. 1 and 14. Seal 4 wherever it is positioned on lift valve 2 must be an elastomeric material to function as a zero leakage seal.

If seal 4 is allowed to float about lift valve 2 in FIG. 1 and FIG. 14 and not be affixed as shown, the kinetic energy of the controlled fluid entering inlet openings 30 traveling thru inlet chamber 20 and ultimately into symmetrical passage 5 will drag with it pliable seal 4, if it is not affixed as shown. If not affixed and being pliable seal 4 will obstruct controlled fluid flow from inlet chamber 20 into symmetrical passage 5. This obstruction of flow raises the pressure drop across the device.

By affixing seal 4 to lift valve 2 as shown the pressure drop across the device is significantly reduced. Thus a more efficient device.

As shown in FIG. 1 and 14 discharge opening 33 is a circumferential slot of 360° opening to both discharge chamber 19 and discharge port 44. It was determined that as one reduced the amount of circumvential discharge slot 19 also raised the pressure drop across the device by inhibiting the flow from chamber 19 thru discharge opening 33 to discharge port 44.

A more efficient device results when discharge opening 33 is a circumferential slot of 360° as shown.

Reference FIG. 1, 4, 5, 6, 8, 9, 10 and 14. As previously described this technology is composed of three pistons. Driving motor pistons 1 and 13 and metering piston 29. For these pistons to function properly within their respective chambers 20, 19 and 21 a seal must be provided between said pistons and the chamber walls along which they reciprocate.

In selecting a seal one strives for a minimum of friction and yet maintain zero leakage past said seal. Friction increases the pressure drop across the device which is efficiency and leakage causes for error in the ratio of metered fluid to controlled fluid.

As shown in FIG. 1, each piston has a piston ring groove 57, 58 and 53 respectively. Into each groove is positioned on its bottom in tension an elastomeric "o" ring seal 31, 32 and 35 respectively. Also positioned within said grooves and biasing the respective "o" ring seal are continuous sealing rings 3, 14 and 28 respectively.

Additionally, continuous sealing rings 3, 14 and 28 also bias their respective chambers 20, 19 and 21 walls.

Each of these 3 sub-assemblies consisting of piston ring groove 57, 58 and 53 respectively, elastomer "o" ring seal 31, 32 and 35 respectively, continuous sealing ring 3, 14, and 28 respectively and chambers 20, 19 and 21 respectively are constructed as follows.

Elastomeric "o" ring seals 31, 32 and 35 are assembled in tension on the bottom of the groove 57, 58 and 53 respectively. Said grooves are sufficiently wide to allow for expansion of elastomeric "o" ring seals 31, 32 and 35 when subjected to compression in assembly with continuous sealing ring 3, 14, and 38 respectively. Said continuous sealing rings are designed such that they loosely fit between the walls of piston ring groove 57, 58 and 53 respectively. This is to allow for pressurized controlled fluid to contact and pressurize elastomeric "o" ring seals 31, 32 and 35.

Additionally, the continuous sealing rings 3, 14 and 28 respectively are sufficiently thick (inside diameter to outside diameter) such that in assembly said thickness compresses elastomeric "o" ring seal 31, 32 and 35 approximately 10% to 20% of said "o" ring seals diameter when in tension as described.

It has been determined that the continuous sealing rings 3, 14 and 28 when made of teflon or glass filled teflon can be expanded on a tapered arbor from their free state inside diameter to an inside diameter sufficiently large to allow assembly into its respective groove 57, 58 and 53. Where upon by utilizing a tapered die one can re-compress the enlarged diameter continuous sealing ring 3, 14 and 28 to a size equal to or less than its free state outside diameter to allow for assembly into its chamber 20, 19 and 21 respectively.

This achieves for a minimum of friction seal with a zero leakage seal assembly.

Figures 4, 5, 6, 7:
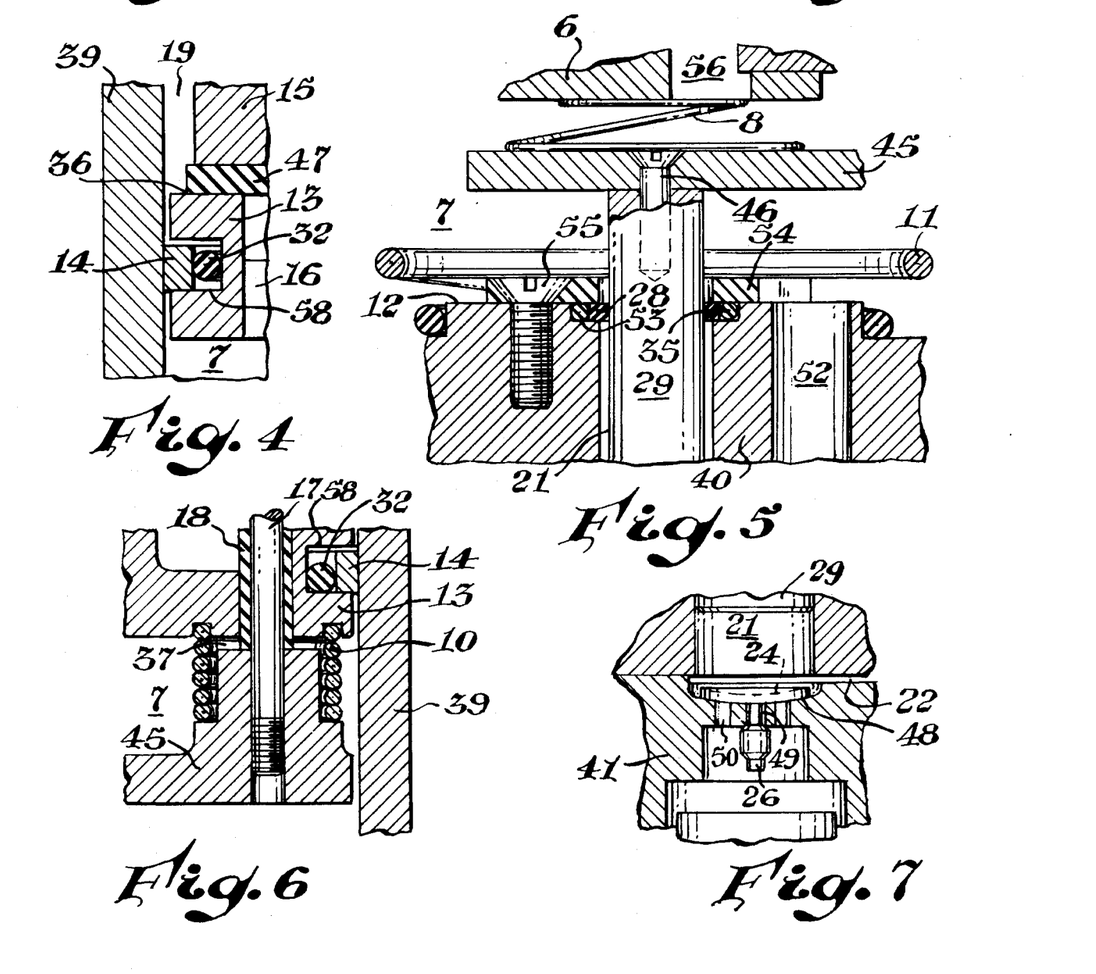
FIG. 4 is an enlarged fragmentary sectional view of the sealing assembly of cylinder, piston, and piston ring and elastomer backing.
FIG. 5 is an englarged fragmentary sectional view of the conical reversing valve spring and the conical reversing valve biasing spring.
FIG. 6 is an englarged fragmentary sectional view of a biasing spring loading the flow control valve via its connector.
FIG. 7 is an enlarged fragmentary sectional view of the input concave check valve and concave check valve seat assembly.

Reference FIG. 1 and 5 reversing spring 11. It was determined that by utilizing spring 11 as a tapered spring as shown which collapses into itself to 1 turn minimum height yields a device with an increased stroke length. This is as compared to a cylindrical coiled spring which when collapsed totally has a minimum height equal to its number of turns.

Increased stroke length for a specified device increases the flow per minute thru same and its accuracy of proportioning. The less motor cyclic reversals per minute saves time thus yielding more flow. The less reversals per minute of the check valves 23 and 24 shown in FIG. 1, 9, 10 and 11 reduces the error of driving fluid to injected fluid.

Reference FIG. 1 and 6 specifically spring loaded flow control valve 15's loading springs 10. Flow control valve 15 may alternatively be spring loaded from top of said valve 15 by positioning a spring(s) over and biasing said valve by pushing on same.

However, this then would require an added detail(s) to facilitate retaining said spring in a fixed position relative to piston 1 and valve 15.

By positioning loading springs 10 as shown in FIG. 1 and FIG. 6 which are in a position of pulling valve 15 versus pushing said valve to a biased closed position yields the same functional results desired but facilitates the removal of spring retaining details which would otherwise be required about piston 1.

This method of loading springs 10 being a pulling force versus a pushing force biasing valve 15 allowed for the outside diameter of piston 1 to be reduced. As piston 1 is downsized and all else remains the same results in the device cycling faster per fixed time frame. The faster the device travels (i.e. cycles) the controlled fluid thru the device increases.

For any such proportioning device increasing the controlled fluid flow capability thru the device as just described Increases the cycles per minute of the device. That is by reducing flow restrictions and time delays as described.

Conversely, if one maintains a constant flow supply of controlled fluid and reduces proportionally the physical size of the device will also result in a significant increase in the cyclic speed of the device.

The aforementioned enhancements facilitated an increase in volume of controlled fluid thru the device of a fixed size. Or, for a fixed volume of controlled fluid thru a device it was possible to significantly reduce the physical size of the device.

However, to maintain or improve the accuracy of controlled fluid to metered fluid for such an increase in cyclic speed of the device the following considerations were determined to be required.

Reference FIG. 1, 7, 9, 10, 11 and 15. Input check valve 24 and output check valve 23 are identical other than their checking functions. That is they are a pliable elastomeric entity consisting of said valve 24 and 23 which are flat and round to which is integrally molded a stem 26 and 27 respectively consisting of an integral leg connected to a retaining ball.

Figure 15:
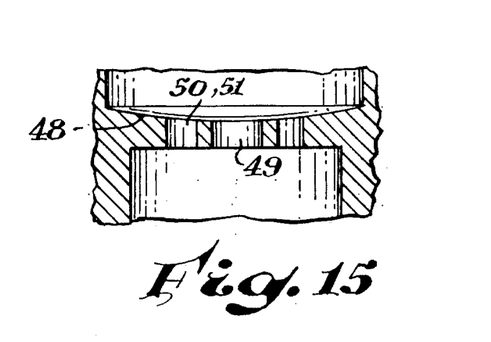
FIG. 15 is an enlarged fragmentary cross sectional view of the concave check valve seats of FIG. 12A and FIG. 12B showing the check valve locking hole and communicating holes.

Checking valve 23 and 24 are positioned and retained on concave checking seat 48 FIG. 15 by pulling integral leg and locking ball 26 and 27 respectively thru seat 48 central hole 49. Depth of said hole is such that it is 0.005 to 0.010 bigger than the distance from the bottom side of check valve 23 and 24 where said integral valves leg begins to where said intergral locking ball begins on stem entities 27 and 26 respectively.

This effectively preloads said flat checking valve 24 and 23 against their respective concave seats 48.

Concave seat 48 as shown as an individual entity in FIG. 15 is contoured concave to improve accuracy. It was determined that by said seat 48 going from a flat face to a concave contour in combination with aforementioned preloading of check valves 23 and 24 resulted in an improved accuracy of metered fluid to driving fluid. This accuracy improvement results from the valves returning to a closed position much faster.

FIG. 15 shows the option of one or more holes 50 or one or more slots 51 positioned in the concave checking seat 48.

Figure 12A:
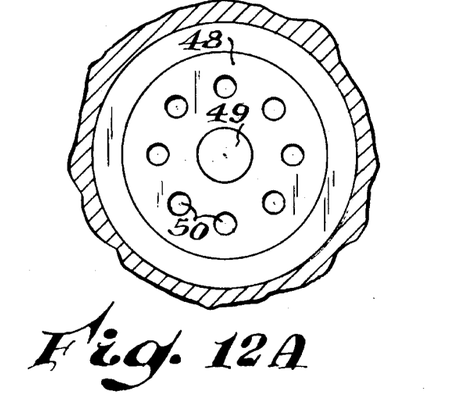
FIG. 12A is an enlarged fragmentary top view of the concave check valve seat utilizing one row of multiple holes on a circular array.
Figure 12B:
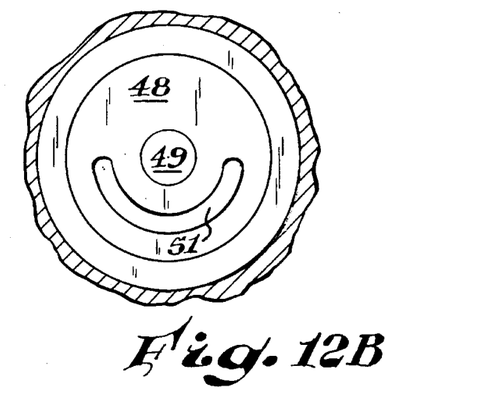
FIG. 12B is an enlarged fragmentary top view of the concave check valve seat utilizing a single elongated hole on a circle.
Figure 13A:
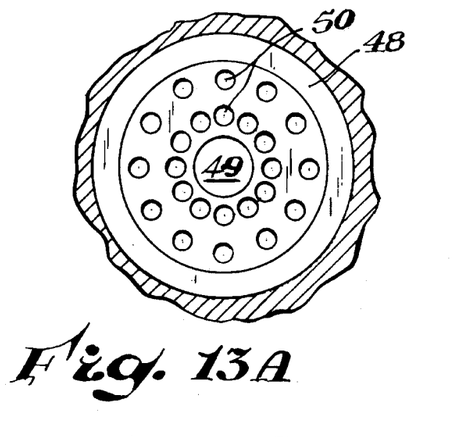
FIG. 13A is an enlarged fragmentary top view of the concave check valve seat utilizing multiple circular rows of multiple holes per row on multiple circles.
Figure 13B:
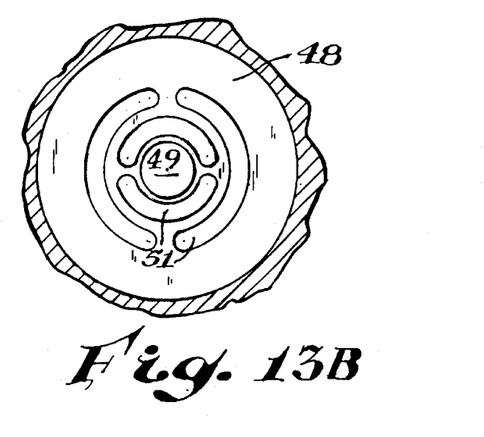
FIG. 13B is an enlarged fragmentary top view of the concave check valve seat utilizing multiple circular rows of multiple elongated holes per circle.

Concave seat 48 in addition to central hole 49 which is said retaining and biasing means for check valves 23 and 24 also includes one or more passages 50 or 51 FIGS. 12 and 13 which allow metered fluid flow passage in one direction thru said seat check assembly.

FIG. 12A and 13A show a plurality of holes 50 in seat 48 to facilitate said metered fluid passage. Check valves 23 and 24 reside over said passage holes 50 as seen in FIG. 12A and FIG. 13A and allow passage in one direction and inhibit said flow in the opposited direction.

FIG. 12B and 13B show an alternate to said holes of FIG. 12A and 13A. That being one or more slots 51. Depending on the metered fluids viscosity, particle size, ratio of metered fluid and solidification characteristics one may choose the slot 51 versus holes 50.

If one were metering concentrated orange juice which contained pulp fibers the holes 51 of seat 48 FIGS. 12A and 13A would not suffice since a long single piece of pulp could enter different holes at the same time and lodge. Hence one would use the slot 51 concept of check valve 48 in FIG. 12B.

Conversely if a metered fluid of viscosity similar to water were to be metered but the driving fluid was at 200 or 300 P.S.I. one would choose seat 48 FIG. 12A or 13A. This selection is made for the large amount seat 48 support area around each hole so to support the check valve 23 and 24. Without such support area check valve 23 and 24 exposed to such pressures but backed by seat 48 FIG. 12B and 13B may result in said check valve being pushed into and down slot 51 thus malfunctioning.

Figure 8:
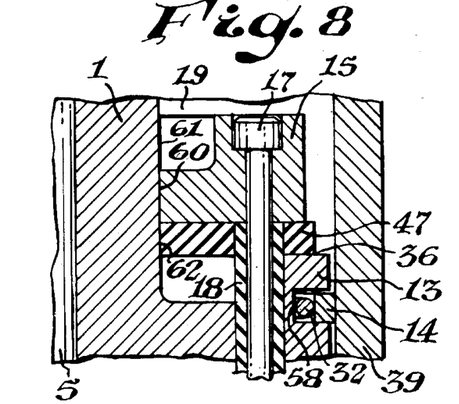
FIG. 8 is an enlarged fragmentary sectional view of the elastomer biasing the flow control valve assembly making both a circumferential and face seal.

It was also determined that spring loaded flow control valve 15 as in FIG. 1, 4 and 8 which makes face seal 36 with piston 13, elements 13 and 15 both being a rigid entity, would allow leakage past seal 36 due to imperfections in said elements.

By positioning pliable face seal enhancer 47 as seen in FIG. 1, 4 and 8 between element 13 and 15 provides for a zero leakage seal. Said enhancer 47 compensates for rigid members 13 and 15 face imperfections.

Additionally, in FIG. 1 and FIG. 8 flow control valve 15 surface 60 fits around piston 1 surface 61. This fit must be tight as possible to inhibit controlled fluid and metered fluid from leaking by said juncture of 60 and 61. But element 15 and 1 are both rigid members and must also be capable of moving axially independently (i.e. lost motion 37) yet seal in all positions of the devices cyclic functions. Surfaces 60 and 61 do not provide for both movement capability and inhibit leakage.

By positioning pliable face seal enhancer 47 surface 62 about the surface of piston 1 in tension eliminates said leakage path and allows for said required axial movement (i.e. lost motion 37). Leakage of either control led fluid or metered fluid causes for error in the ratio of metered fluid to controlled fluid.

Figure 9:
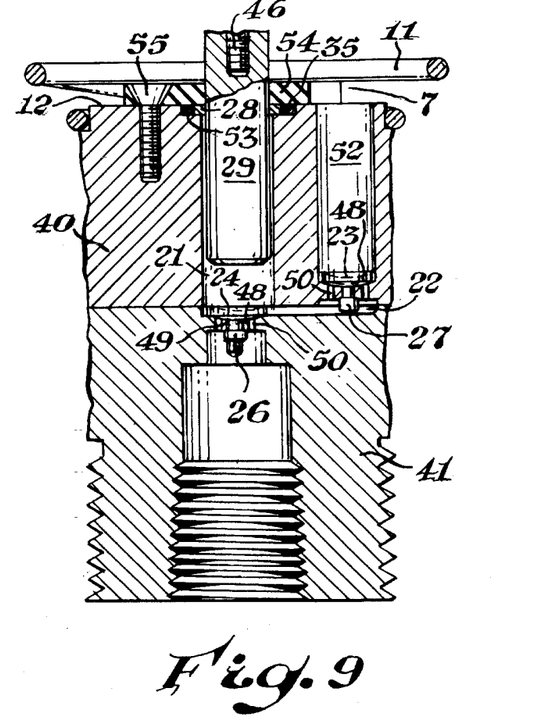
FIG. 9 is an enlarged fragmentary sectional view of an off centerline internal porting of the input and output concave check valve system.

FIG. 1 and 9 demonstrate a method to meter proportionally and internally mix the metered fluid with the controlled fluid when the metering piston 29 is too small physically to receive in its diameter, anywhere in its length output check valve 23 and its seat 48. By positioning seat 48 and valve 23 as shown, metered fluid is transferred from cylinder 21 via passage way 22 to check valve 23 thru stand pipe 52 to mixing chamber 7 during metering piston 29's pumping cycle.

Figure 10:
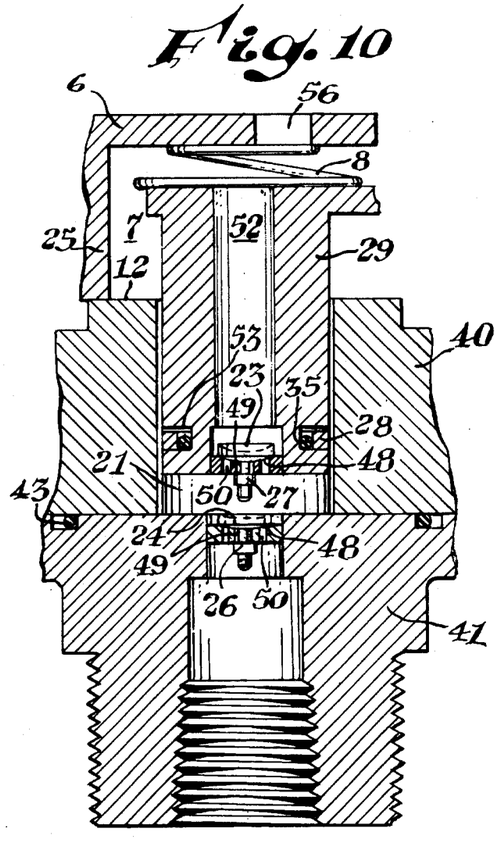
FIG. 10 is an enlarged fragmentary sectional view of an on-center line internal porting of the input and output concave check valve system.

FIG. 10 illustrates a method to meter proportionally and internally mix the metered fluid with the controlled fluid where the output check seat 48 and check valve 23 can be positioned within metering piston 29 provided it is sufficiently large enough to do so.

Figure 11:
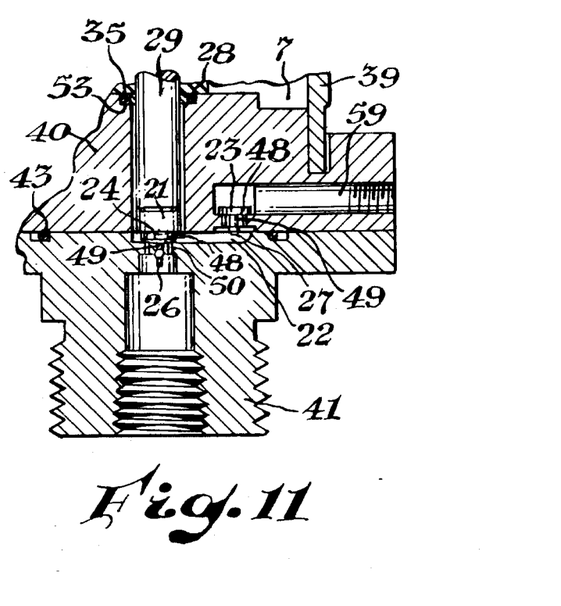
FIG. 11 is an enlarged fragmentary sectional view of an off-center line external porting of the input and output concave check valve system.

FIG. 11 illustrates a method to meter proportionally and externally port the metered fluid. This method is applicable regardless of metering piston 29's diameter. During the pumping cycle of piston 29 metered fluid is transferred from chamber 21 via passage way 22 to check valve 23 and ultimately to external port 59.

FIG. 1, 9 and 10 demonstrate the internal mixing of controlled fluid in mixing chamber 7 with metered fluid exiting stand pipe 52.

It was observed in FIG. 1, 9 and 10 that the closer the exit of stand pipe 52 is to the one or more orifice opening 16 in piston of greater working area 13 the more consistency of mixing controlled fluid to metered fluid results. Using a transparent cylinder 39 and a darkly dyed metering fluid it was observed that during the downward motor stroke (ie. spring loaded lift valve 2 is closed) and fluid is transferring from mixing chamber 7 thru orifice opening 16 in motor piston 13 that a vortex action occurs such that metered fluid exiting out of stand pipe 52 gets caught in the vortex action of orifice 16 and mixes with that controlled fluid causing the vortex action by passing thru orifice 16 to discharge chamber 19.

Note that said metered fluid doesn't mix with all of the controlled fluid in mixing chamber 7 but just that portion transferring thru orifice 16. But then this is the exact incremental amount of controlled fluid and metered fluid that should be mixing.

This vortex accuracy action was observed for a total flow of mixture output from discharge port 44 for as low as ½ oz. per minute to 5 G.P.M.

Additionally, the accuracies observed for both extremely low flow (ie. ½ oz. per minute) to extremely high flow (i.e. 5 G.P.M. ) out of discharge port 44 were obtained whether one input throttled or output throttled the device.

That is the flow rate of mixed fluid exiting discharge port 44 is either regulated by controlling the rate of flow of controlled fluid entering the one or more inlet openings 30 (ie. input throttle) or by controlling the flow rate of fluid exiting discharge port 44 (ie. output throttle).

The technology of the device defined herein results in a significant improvement in accuracy and increase of flow range spread over U.S. Pat. No. 4,832,071, the referenced technologies and other devices not mentioned for both input and output throttling.

To maintain a +/− 2% maximum error capability or a flow spread from minimum flow to maximum flow of 1000 ( i.e. ½ oz. per minute to 5 G.P.M.) is a significant improvement. Additionally, said same improvements also provide for the device to draw a vacuum of 27 inches of mercury and check valves capable of holding a seal for days.

In summary, utilizing my original invention U.S. Pat. No. 4,832,071 I attempted to physically scale it down to make it more commercially attractive yet maintain its functional characteristics. Downsizing the original technology resulted in failure. Downsizing caused the velocity of the driving fluid thru the device to significantly increase to a speed my original patent failed to function. Unexpectedly I found that in solving the aforementioned failure dilemma yielded a much enhanced device with improvements in the area of:

A. PHYSICALLY DOWNSIZING - The outside diameter from 2.5 inches to 1.875 inches;

B. MAXIMUM FLOW - Maintained at 5 G.P.M.;

C. MINIMUM FLOW - Capability increased from 0.5 G.P.M. to 0.005 G.P.M.;

D. ACCURACY IMPROVEMENT - From +/− 10% to +/− 2% maximum error over the total flow range;

E. INTERNAL COMPONENTS REDUCED - In quantity;

F. EXPANDED USE CAPABILITIES - Due to size, accuracy, function capabilities all being enhanced as just noted.

The enhancements utilized to accomplish the aforementioned must all be utilized as a system or the aforementioned results will not occur. In summary, the actions taken which yielded the unexpected results are:

A. Off-center one or more inlet openings 30 FIG. 1;

B. Affixed lift valve seal 4 FIG. 1;

C. 360° discharge opening 33 FIG. 1;

D. Continuous piston ring seal 3, 14 and 28 FIG. 1 backed by respective elastomeric "o" ring 31, 32 and 35 FIG. 1;

E. Tapered reversing spring 11 FIG. 1;

F. Pulling spring(s) 10 FIG. 1;

G. Concave check valve seat 48 FIG. 1;

H. Flat face check valves 23 and 24 FIG. 1 with respective elastomeric stem and ball 27 and 26 FIG. 1;

I. Face seal enhancer 47 FIG. 1; and

J. Output check standpipe 52 FIG. 1 and FIG. 10.

While the foregoing has illustrated and described what is contemplated to be the best mode of carrying out the invention, the description is, of course, subject to modifications without departing from the spirit and scope of the invention. Therefore, it is not desired to restrict the invention to the particular construction illustrated and described, but to cover all modifications that may fall within the scope of the appended claims.

It is understood that the foregoing description is that of the preferred embodiments of the invention and that various changes and modifications may be made thereto without departing from the spirit and scope of the invention as defined in the appended claims.

I claim:

1. A fluid motor-metering device for the use with a source of controlled fluid, with a controlled fluid discharge means and a metered-fluid source which comprises:

an accessible, cylindrical housing unit having one or more control fluid inlet openings connected to a control fluid inlet chamber, having therein and aligned to and symmetrical with the control fluid inlet chamber, a discharge chamber, additionally having and aligned to, and symmetrical with the control fluid inlet chamber, a mixing chamber and a metered-fluid chamber connected to a metered-fluid source and positioned within said housing unit an assembly of valves, pistons and seals between pistons and chambers capable of reciprocal movement within said housing unit which further comprises;

interposed and positioned within said assembly of valves and pistons, a first piston of lesser working area positioned within the control fluid inlet chamber, biased on one end by the pressure in the controlled inlet chamber, and biased by the pressure within the discharged chamber on the other end and also having a central, axial passageway positioned therein and capable of transmitting the controlled fluid from the control fluid inlet chamber to the mixing chamber;

interposed and positioned within said assembly of valves and pistons, a second piston of greater working area inter-connected with said first piston and positioned within the discharge and mixing chambers one end biased with the pressure in the discharge chamber, the other end biased with the pressure of the mixing chamber, and further having at least one orifice which permits the transmission of the metered fluid and the controlled fluid from the mixing chamber to the discharge chamber;

within said assembly an injection metering piston interconnected with the first piston and second piston, and biased with the pressure in the mixing chamber on one end and biased with the pressure in the metering chamber on the other end;

a checked valve passage way capable of transmission of metered fluid from the metered chamber;

a spring loaded lift valve positioned within the axial passageway of said first piston, said valve is biased with the pressure in control-fluid inlet chamber in one end, and biased with pressure in the mixing chamber in the other end;

a spring loaded reversing valve axially positioned within said second piston and axially engaging said spring loaded lift valve in the axially passageway in the first piston and capable of controlling the passage of the metered-fluid and its controlled fluid through at least one orifice of the second piston;

and a spring loaded, flow control valve, axially positioned to and adjacent to said second piston, biased with the pressure by said orifices in said second piston on one end, and biased with the pressure of the discharge chamber on the other end, and said valve being capable of controlling the metered-fluid and the controlled fluid through at least one of the orifices in said second piston.

2. The cross sectional plane of the controlled fluid of one or more inlet openings does not intersect the cross sectional plane of the spring loaded lift valve of claim 1.

3. The spring loaded lift valve of claim 1 being provided with an affixed elastomeric seal which cycles with same.

4. The fluid discharge means of claim 1 being a 360° slot.

5. The piston chamber and the seals of claim 1 being an assembly of a continous elastomer and continuous residing in a piston groove with said elastomer biasing said groove bottom in tension and biasing said seal and said seal biasing said elastomer and chamber in compression and said groove and seal width sufficiently different to allow controlled fluid access past said seal to bias said elastomer.

6. The continuous seal in claim 5 being made of teflon (R).

7. The continuous seal in claim 5 being made of glass filled teflon (R).

8. The continuous elastomer in claim 5 being an "o" ring.

9. The spring of the spring loaded reversing valve in claim 1 being a conical coiled spring.

10. The springs of the spring loaded flow control valve in claim 1 positioned such that the valve is pulled to a closed position by said springs.

11. The checked valve-passage in claim 1 having positioned therein a check valve assembly of a pliable elastomer in tension over a seat.

12. The pliable elastomer in tension of claim 11 being an integral member composed of a flat sealing head with a retaining stem composed of a leg and locking protrusion.

13. The check valve seat sealing face of claim 11 being concave.

14. The check valve seat of claim 13 being provided with one or more metered fluid transmission holes.

15. The check valve seat of claim 13 being provided with one or more metered fluid transmission slots.

16. The spring loaded flow control valve of claim 1 being provided with an elastomeric enhancer which biases the piston of lessor working area, the piston of greater working area and said flow control valve.

17. The check valve passage way of claim 1 being axially positioned within the metering piston capable of transmission of metered fluid from the metering chamber to the mixing chamber.

18. The check valve passage way of claim 1 being external of the metering piston and metering chamber but capable of transmission of fluid from the metering chamber to the mixing chamber.

19. The check valve passage way of claim 18 capable of transmission of metered fluid from the metering chamber to an external position.

20. The check valve passage way of claim 17 or 18 configured such that the distance from said passage way's exit to the entrance of the one or more orifices of the piston of greater working area is minimized.

21. The affixed elastomeric seal of claim 3 being an "o" ring.

* * * * *